United States Patent [19]

Morita et al.

[11] Patent Number: 4,732,485

[45] Date of Patent: Mar. 22, 1988

[54] OPTICAL SURFACE PROFILE MEASURING DEVICE

[75] Inventors: Terumasa Morita; Noriyuki Miyahara, both of Hachiouji, Japan; Hisao Kitagawa, Hamburg, Fed. Rep. of Germany

[73] Assignee: Olympus Optical Co., Ltd., Tokyo, Japan

[21] Appl. No.: 852,845

[22] Filed: Apr. 16, 1986

[30] Foreign Application Priority Data

Apr. 17, 1985 [JP] Japan ................................. 60-81993
May 14, 1985 [JP] Japan ................................ 60-102237
Jun. 19, 1985 [JP] Japan ................................ 60-132025

[51] Int. Cl.⁴ .......................................... A01B 11/30
[52] U.S. Cl. ................................ 356/376; 250/201
[58] Field of Search ........................... 356/375, 376; 250/201 AF, 201 DF; 369/45

[56] References Cited

U.S. PATENT DOCUMENTS

| | | |
|---|---|---|
| 3,606,541 | 9/1971 | Sugano et al. ............... 356/376 |
| 3,715,165 | 2/1973 | Smith ............................ 356/376 |
| 4,088,408 | 5/1978 | Burcher et al. ............... 356/376 |
| 4,280,215 | 7/1981 | Okano ....................... 250/201 DF |
| 4,423,495 | 12/1983 | Musha et al. .............. 250/201 DF |
| 4,455,085 | 6/1984 | Kato et al. ...................... 369/45 |
| 4,464,741 | 8/1984 | Compaan ....................... 369/45 |
| 4,501,493 | 10/1985 | Kubota ........................... 250/201 |

FOREIGN PATENT DOCUMENTS 2854057 6/1979 Fed. Rep. of Germany.
3418767 11/1985 Fed. Rep. of Germany.
2120781 12/1983 United Kingdom.

Primary Examiner—R. A. Rosenberger
Attorney, Agent, or Firm—Cushman, Darby & Cushman

[57] ABSTRACT

An optical surface profile measuring device adapted to be able to simultaneously or substantially simultaneously measure a same part on the surface of an object to be measured with two different measuring ranges by combining a surface profile measuring device of a high resolving power using the critical angle method with a surface profile measuring device having a wide measuring range using the astigmatism method, in order to facilitate the setting of a detecting head within a measuring range while maintaining a high resolving power and to enable to measure automatically regardless of the state of the measured surface. This optical surface profile measuring device is provided with an iris stop or liquid crystal shutter capable of varying the numerical aperture behind an objective lens to allow the free setting of the resolving power or the measuring range, and further provided with an aperture stop to make the numerical aperture on the detecting side smaller than the numerical aperture on the projecting side to thereby obtain the proper measuring result even if the measured surface inclines with respect to the optical axis.

27 Claims, 36 Drawing Figures

FIG. 17
| NA | SPOT SIZE (μm) |
|---|---|
| 0.6 | 1.6 |
| 0.5 | 1.9 |
| 0.4 | 2.4 |
| 0.3 | 3.2 |
| 0.2 | 4.8 |
| 0.1 | 9.5 |
FIG. 18
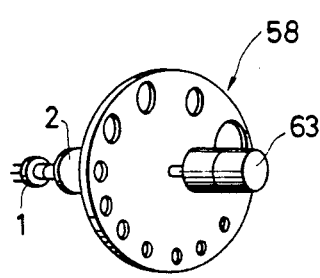
FIG. 19
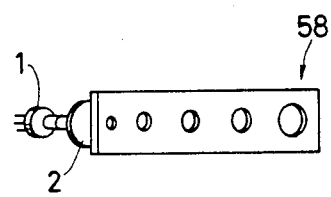
FIG. 20
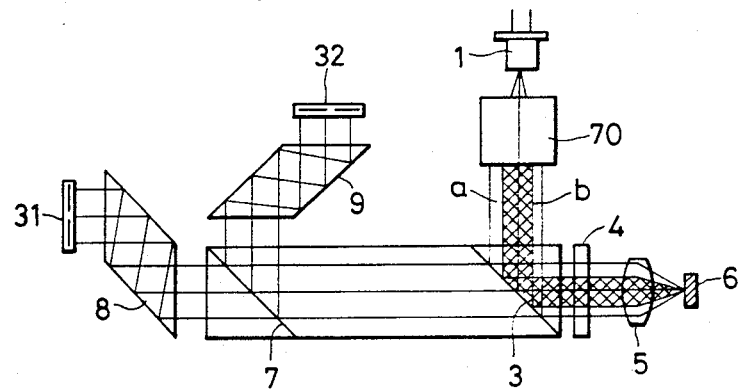

OPTICAL SURFACE PROFILE MEASURING DEVICE

BACKGROUND OF THE INVENTION (a) Field of the Invention

This invention relates to an optical surface profile measuring device for contactlessly measuring such minute variations as the surface roughness or step height of objects.

(b) Description of the Prior Art

With the recent remarkable development of the precise working technique, products and parts having minute profiles worked on the surfaces have been increasing. Such surfaces as LSI patterns, diffraction gratings, optical discs and roughness standard pieces can be said to be typical examples having regular minute profiles. Also, step heights made by etching on silicon wafers, cross-sections of groove-shaped scars on aluminum surfaces and mirror surfaces made by superprecisely working steel surfaces can be said to be minute profiles. For example, the surface roughness of a surface superprecisely worked with a diamond bit has attained submicrons. Such surface roughness as on a laser disc, magnetic tape or film is also of the same dimensional order. Such surface roughness and surface step height variations are measured today substantially with a contact needle type measuring device.

However, most of these products and parts are finished goods and are desired to be able to have minute profiles of the surfaces measured without being scarred. Further, the measured results are often utilized as reference data in the case of the work and measurement in the next stage or as data necessary for the transaction of the products. Therefore, in order to meet such needs, contactless type measuring devices are being developed. Considered to be most practical today among them is an optical type. Various types of optical measuring devices are considered. Measuring devices applying a focus detecting type are noted as having the possibility of improving the measurement precision and making the device small. Devices applying a critical angle method and an astigmatism method are among them.

First of all, a device using the critical angle method is shown, for example, in FIG. 1. Here, an infrared laser beam from a laser diode 1 is projected onto a sample 6 through a collimator lens 2, polarization beam splitter 3, ¼-wave plate 4 and an objective lens 5. The reflected beam enters a critical angle prism 8 or 9 through the objective lens 5, ¼-wave plate 4, polarization beam splitter 3 and beam splitter 7. The beam reflected by the critical angle prism 8 or 9 enters respectively two photodiodes 10 and 11 or 12 and 13 (See FIG. 2) in the formation. In case the measured surface of the sample 6 is a focus position of the objective lens 5, the beam reflected by the measured surface will be made a parallel beam by the objective lens 5 and enter the critical angle prism 8 or 9. At this time, if the critical angle prism 8 or 9 is so set that the incident beam may be incident just near the critical angle, a beam of the same light amount will reach the respective two photodiodes 10 and 11 or 12 and 13 as shown in FIG. 2B. In case the measured surface is in a position nearer to the objective lens 5 than the focus position, the reflected beam will pass through the objective lens 5, will then become a dispersed beam and will be incident upon the critical angle prism 8 or 9. At this time, as the angle of incidence is different on both sides of the optical axis, the part of the beam on the side not meeting the conditions of total reflection will go out of the prism 8 or 9, but the part of beam on the side meeting the conditions of total reflection will be totally reflected and therefore, as shown in FIG. 2A, only a small amount of radiation will reach the photodiode 10 or 12 but a sufficient amount of radiation will reach the photodiode 11 or 13. In case the measured surface is in a position farther from the objective lens 5 than the focus position, contrary to the above, as shown in FIG. 2C, a sufficient amount of radiation will reach the photodiode 10 or 12 but only a small amount of radiation will reach the photodiode 11 or 13. Therefore, when the sample 6 is moved and scanned in the directions indicated by the arrows in FIG. 1 while reading out the output differences between the respective two diodes 10 and 11 or 12 and 13, the surface roughness and fine step height of the measured surface will be able to be measured.

As a surface profile measuring device using the astigmatism method, there is a device shown, for example, in FIG. 3. Here, a laser beam from a laser light source 14 enters a polarization beam splitter 16 through a spatial filter 15 and is then projected onto a sample 19 through a ¼-wave plate 17 and an objective lens 18. The reflected beam enters a cylindrical lens 21 or 22 through the objective lens 18, ¼-wave plate 17, polarization beam splitter 16 and beam splitter 20. The beam is collected so as to produce an astigmatism by the cylindrical lens 21 or 22 an enters a detector 23 or 24 (See FIG. 4) consisting respectively of four photodiodes 25, 26, 27 and 28 in the formation. In this optical system, as there is an astigmatism, in case a spot image from the laser light source is incident upon the measured surface of the sample 19, the shape of the spot image formed on the detector 23 or 24 after it is reflected on the measured surface will be deformed as shown in FIGS. 4A, 4B and 4C in front and rear of the focus. When the image is detected by the photodiodes 25, 26, 27 and 28 and is calculated as $(V_{25}+V_{27})-(V_{26}+V_{28})$ and, while reading the values, the sample 19 is moved in the directions indicated by the arrows to be scanned, the surface roughness and fine step height of the measured surface will be able to be measured, where $V_{25}$, $V_{26}$, $V_{27}$ and $V_{28}$ represent respectively the output of the detectors 25, 26, 27 and 28.

Now, in such optical surface profile measuring device using the critical angle method as is mentioned above, a high resolving power of a maximum of about 1 μm. can be attained but it is only in a range of about ±1 μm. at most that there is a linearity in the relation between the step height change and the output. Therefore, there have been problems that, in the case of the measurement, first of all, the detecting head must be set at a range of only 2 [2m., that, if there are irregularities of more than ±1 μm. on the surface of the object to be measured, the measured surface will be out of the measuring range and will not be able to be automatically measured and that such an optical surface profile measuring device using the astigmatism method as is mentioned above has a wide measuring range (more than several tens of μm.) but is low in resolving power.

On the other hand, in such optical surface profile measuring devices using the critical angle method as is mentioned above, as a method of expanding the measuring range, there is a method wherein the objective lens is replaced with a lens of a small NA, deep focal depth and low magnification. However, in such conventional objective lens replacing system as, for example, a turret system, the objective lens part becomes considerably large, the center is likely to be displaced and it is difficult to keep the parfocal at a required precision. Even in a system of replacing a single objective lens, it is difficult to maintain the center at a high precision and to keep the parfocal at a required precision. The work of replacing the objective lens is complicated. Particularly it is very difficult to make an in-process measurement. Also, it is toilsome to prepare a plurality of surface profile measuring devices different in resolving power and measured range and to replace the surface profile measuring device in response to the object to be measured. Even if the measured object is the same, it will be substantially impossible to measure the same place. The economic loss is great.

Further, in such optical surface profile measuring devices using the critical angle method as is mentioned above, there has been a problem that, when the inclination of the measured surface is larger than a maximum of ±5°, the measurement will not be able to be made. Generally, in the case of using such surface profile measuring devices, there will be a requirement of obtaining a series of data while continuously measuring the surface of the object to be measured as described above. However, generally, on the surface of the object to be measured, such long periodic structures as waviness and chatter are present and the inclination of the surface to be measured can not be neglected in most cases. There has been a problem that, in such a case, due to the above mentioned problems, it will be difficult to continue the measurement. Further, there has been a problem that the set angle allowable range of the measured surface is so narrow that, in case such structure of the measured surface as is mentioned above is considered, in the case of beginning the measurement, a complicated setting operation will have to be made and such continuous measurement as in-process measurement will be made difficult. Even in the measurement of the profile of the inclined part of such a sample having step heights as an LSI pattern and in the inspection of the surface profile of such work inherently having an inclined structured on the surface as a superprecise bearing, high sensitivity measurement with no contact has come to be required. However, there has been also a problem that the conventional optical surface profile measuring device can not meet such multiple requirements.

SUMMARY OF THE INVENTION

Therefore, a primary object of the present invention is to provide an optical surface profile measuring device which can be easily set within a detecting head measuring range while maintaining a high resolving power and can always automatically measure the surface to be measured irrespective of the surface state.

According to the present invention, this object can be attained by an arrangement wherein, as shown in FIG. 5, a surface profile measuring device of a wide measuring range is provided coaxially with a surface profile measuring device of a high resolving power so that the same portion to be measured may be simultaneously measured with a plurality of surface profile measuring devices or, as shown in FIG. 9, the measuring range of the surface profile measuring device of a high resolving power is time-divisionally expanded so that the same portion to be measured may be simultaneously measured with a plurality of measuring ranges and a detecting head may be set by using a surface profile detecting signal in the thereby obtained wide measuring range and the relative positions of the detecting head and a stage mounting the object to be measured may be controlled by using said surface profile detecting signal. There is an advantage that a plurality of measured values can be thereby synchronously obtained.

According to a preferred formation of the present invention, a means of varying an NA is provided in the rear of an objective lens so that the NA on the side facing the surface of the object to be measured and the resolving power and measuring range may be thereby freely set. Thus, there is no need of preparing a plurality of surface profile measuring devices separately for the respective uses, the same object to be measured can be substantially simultaneously measured in different ranges and an optical surface profile measuring device which can be applied also to an in-process measurement is provided.

According to another preferred formation of the present invention, a light receiving stop is provided between a polarization beam splitter and detecting means and the numerical aperture on the detecting side is made smaller than the numerical aperture of the beam entering the surface of the object to be measured so that, even if the measured surface inclines, the radiation amounts to be detected may not be unbalanced. Thereby, even if the measured surface inclines to the optical axis, the measured results will be thereby hardly influenced. Therefore, there is realized a surface profile measuring device adapted to the measurement or inspection of such surfaces as a surface having wavinesses or chatters, a profile of an inclined part of a surface having step heights, a nonspherical lens surface and a surface of a superprecise bearing. Even if the object to be measured is set on a stage as more or less inclined, there will substantially hardly appear any influence thereby. Therefore, no complicated operation will be required to set the object to be measured.

These and other objects as well as the features and advantages of the present invention will be apparent from the following detailed description of the preferred embodiments when taken in conjunction with the accompanying drawings.

BRIEF DESCRIPTION OF THE DRAWINGS

FIG. 17 is a table showing the relations between the NA and measuring spot size.

FIGS. 18 and 19 are perspective views showing further respectively other examples of the light path limiting means.

FIG. 20 is a view showing an optical system of the fifth embodiment of the present invention.

DESCRIPTION OF THE PREFERRED EMBODIMENT

Figure 1:
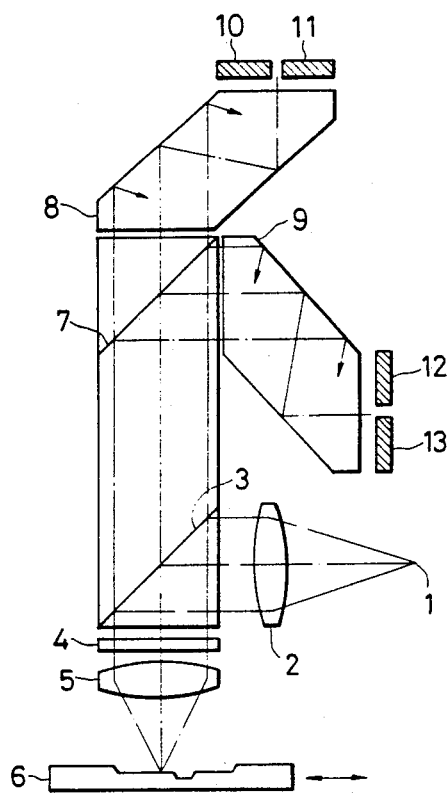
FIG. 1 is a view showing an optical system of an example of a conventional optical surface profile measuring device using a critical angle method.
Figure 2A:
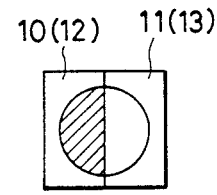
FIGS. 2A, 2B and 2C are views showing light receiving states on the photodiodes in FIG. 1.
Figure 2B:
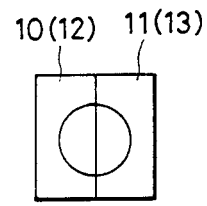
Figure 2C:
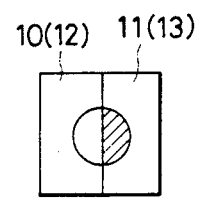
Figure 3:
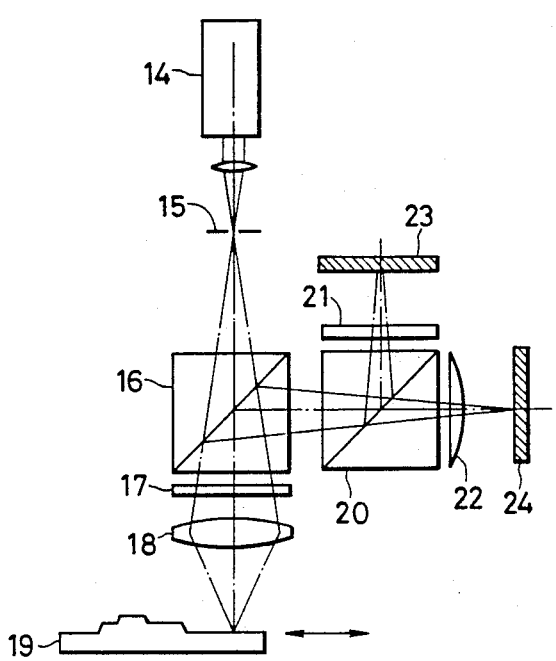
FIG. 3 is a view showing an optical system of an example of a conventional optical surface profile measuring device using an astigmatism method.
Figure 4A:
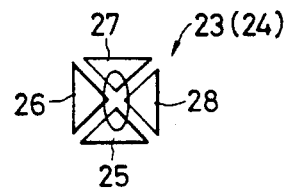
FIGS. 4A, 4B and 4C are views showing light receiving states on the photodiodes in FIG. 3.
Figure 4B:
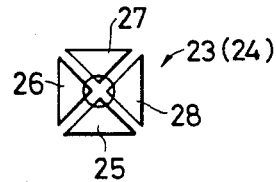
Figure 4C:
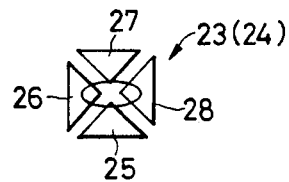

The present invention shall be explained in detail in the following on the basis of the illustrated respective embodiments by attaching the same reference numerals to the same members as in the above mentioned conventional example.

Figure 5:
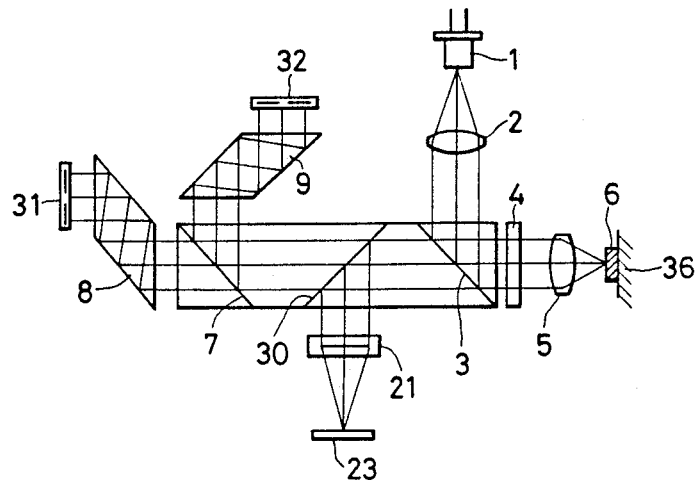
FIG. 5 is a view showing an optical system of the first embodiment of the optical surface profile measuring device according to the present invention.
Figure 6:
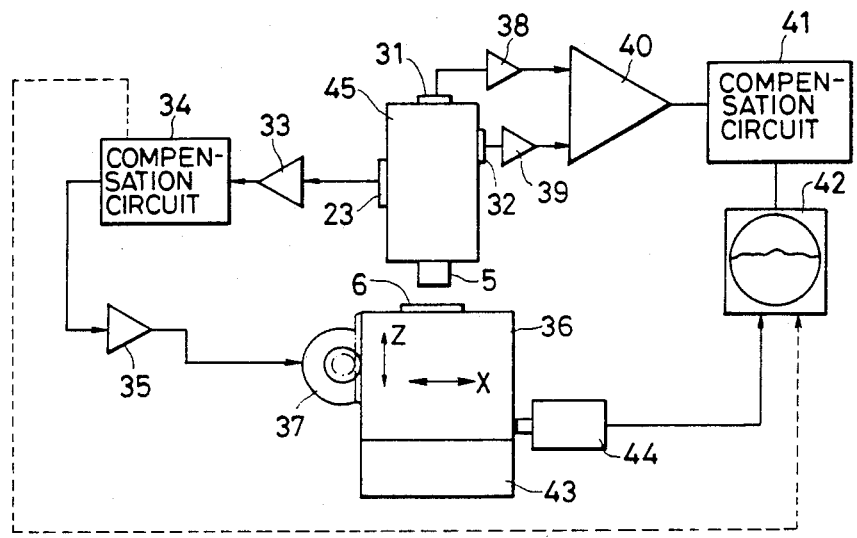
FIG. 6 is a block diagram of a processing circuit adapted to the optical system of FIG. 5.

FIGS. 5 to 7 show respectively an optical system, processing circuit and step height detecting signals of the first embodiment of an optical surface profile measuring device according to the present invention. Therein, a beam splitter 30 is set between a polarization beam splitter 3 and beam splitter 7 of the above mentioned conventional example using a critical angle method so that a part of the reflected beam from the surface of an object 6 to be measured may be deflected and a cylindrical lens 21 is set on the optical axis so that the beam may be imaged on a four-divided photosensor 23. By the way, the reference numerals 31 and 32 represent two-divided photosensors arranged respectively in the rear of critical angle prisms 8 and 9. The output signal of the four-divided photosensor 23 comes to a servo power amplifier 35 through an operation amplifier 33 and compensation circuit 34 so that a servo-motor 37 for driving a stage 36 up and down (in the Z-axis direction) may be controlled by the output signal of the power amplifier 35. On the other hand, the output signals of the two-divided photosensors 31 and 32 are put into an adding circuit 40 respectively through operation amplifier systems 38 and 39 and are put out to a displacement output means 42 through a compensation circuit 41. The stage 36 is driven also in the X-axis direction by an X-axis direction stage driving system 43 and its displacement is detected by a displacement sensor 44 and is transmitted to the displacement output means 42. By the way, the reference numeral 45 represents a detecting head including the optical system of FIG. 1.

As the first embodiment is formed as described above, a part of the reflected beam from the sample 6 will be led outside by the beam splitter 30, will be imaged on the four-divided photosensor 23 by the cylindrical lens 21 and will generate a signal on the basis of the principle of the above mentioned astigmatism method. The focus error signal obtained by the four-divided photosensor 23 will be processed by the operation amplifier 33 and compensation circuit 34 and will be put into the power amplifier and the stage driving servo-motor 37 will be controlled by the output signal of the power amplifier 35. Therefore, a surface area measured with the surface profile measuring device of a high resolving power by the critical angle method will be simultaneously measured with the surface profile measuring device of a wide measuring range by the astigmatism method. If the detecting head 45 is set substantially in the central position of the measuring range by using the displacement detecting signal, as the measuring range is wide, it will be easy to set the detecting head 45. Also, as the relative positions of the sample 6 on the stage 36 and detecting head 45 can be always kept within the measuring range of the surface profile measuring device of a high resolving power by feeding back this displacement detecting signal, if the measurement in the Z-axis direction is made by the critical angle method while driving the stage 36 in the X-axis direction while monitoring the X-axis direction positions of the stage 36 with the displacement sensor 44, even the surface of a sample with large slowly varying surface irregularities will be able to be automatically measured with a high resolving power.

Figure 7A:
FIGS. 7A, 7B, 7C and 7D are views showing surface profile detecting signals obtained by the first embodiment of the present invention.
Figure 7B:
Figure 7C:
Figure 7D:
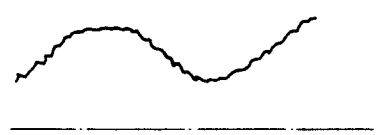

It is needless to say that, if the output of the compensation circuit 34 is sent to the displacement output means 42 as shown with the dotted line in FIG. 6, the formation of the large irregularities of the surface of the sample 6 will be able to be simultaneously put out. Therefore, for the sample 6 of such surface profile as is shown in FIG. 7A, such large irregularities as are shown in FIG. 7B will be put out by the compensation circuit 34, the focus will be automatically adjusted by utilizing this output and therefore the output of the compensation circuit 41 will be a signal of only fine irregularities of the surface of the sample 6 as shown in FIG. 7C. In the displacement output means 42, these two inputs are adjusted in level and phase and are added to be converted to output signals correctly representing the surface profiles as shown in FIG. 7D and may be indicated by such means as a CRT display and/or recorder. The two synchronized output signals may be individually indicated. It is needless to say that only the signal shown in FIG. 7B or 7C can be put out. By the way, the detecting head 45 itself may be utilized instead of the displacement sensor 44.

Figure 8:
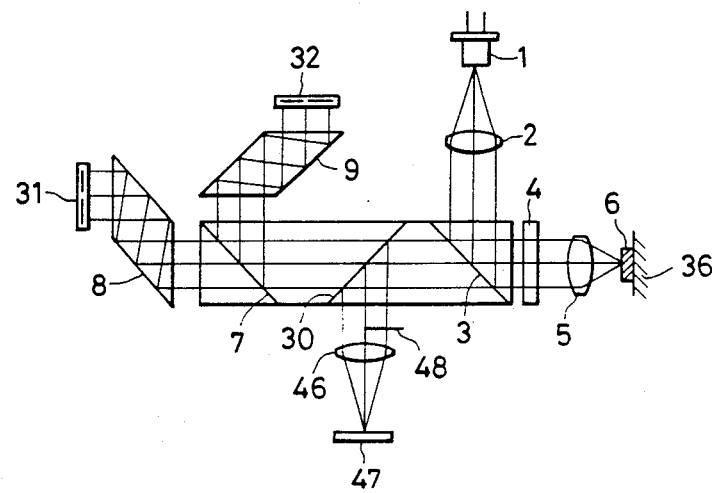
FIG. 8 is a view showing an optical system of the second embodiment of the present invention.

FIG. 8 shows an optical system of the second embodiment. This is the same as in the first embodiment except that, in the first embodiment, the cylindrical lens 21 is replaced with an image forming lens 46, the four-divided photosensor 23 is replaced with a PSD (semiconductor position detecting element) 47 and a fixed light path limiting member 48 limiting the beam to half the optical path is arranged between the beam splitter 30 and image forming lens 46. By the way, the image forming lens 46 is arranged to image the beam on the PSD.

As this second embodiment is formed as described above, half the cross-section of the beam taken out on the side by the beam splitter 30 will be shielded by the light path limiting member 48 and the remaining beam will be imaged on the PSD 47. As the remaining beam is an off-axis beam, its image forming position will move in response to the position of the sample 6 on the optical axis. The same effect as in the first embodiment is obtained by detecting this movement. By the way, a two-divided photosensor may be used instead of the PSD 47.

Figure 9:
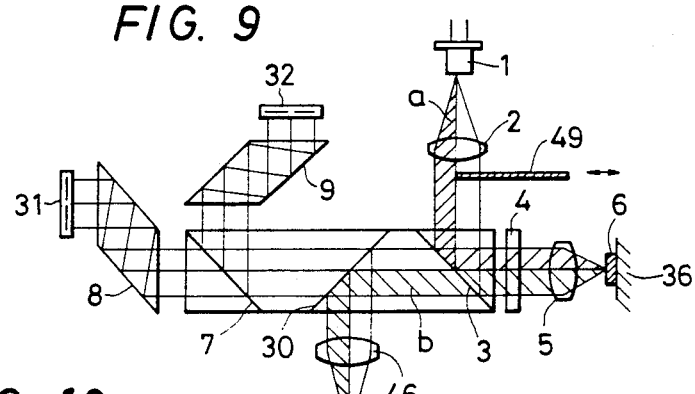
FIG. 9 is a view showing an optical system of the third embodiment of the present invention.
Figure 10:
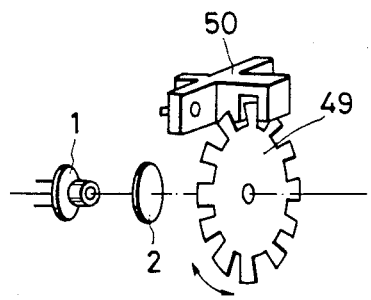
FIG. 10 is a perspective view showing an example of a light path limiting means used in the third embodiment.
Figure 11:
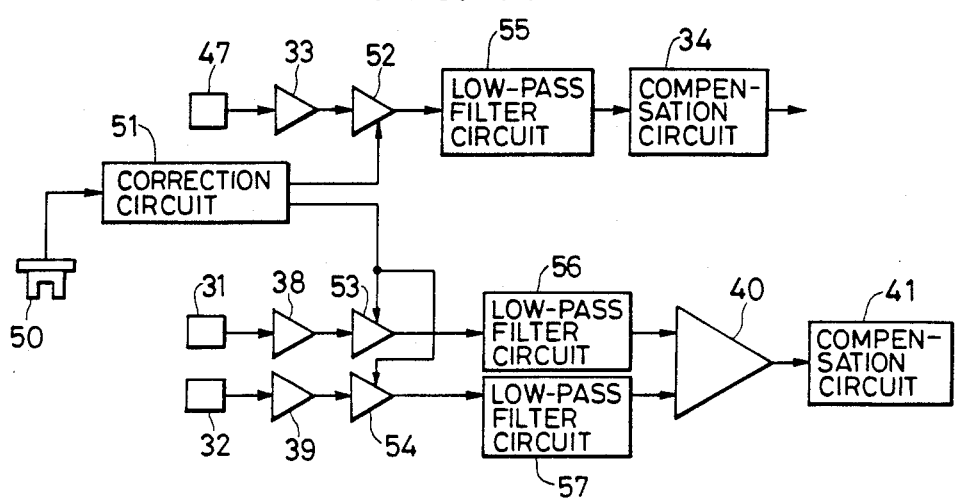
FIG. 11 is a block diagram of a processing circuit adapted to the optical system of FIG. 9.

FIGS. 9 to 11 show respectively an optical system, light path limiting means and processing circuit of the third embodiment. This is the same as in the first embodiment except that, in the first embodiment, the cylindrical lens 21 is replaced with the image forming lens 46, the four-divided photosensor 23 is replaced with the PSD 47 and a removable light path limiting member 49 is arranged in the light path between the collimator lens 2 and polarization beam splitter 3. Many types of limiting members may be used such as the chopper shown in FIG. 10, or a liquid crystal shutter described later, or a solenoid (not illustrated) can be utilized for the light path limiting member 49.

The synchronizing signal for the light path limiting member 49 will be put out of a sensor 50 (FIG. 10), will be put into sampling circuits 52, 53 and 54 through a correction circuit 51 and the outputs of the operation amplifier 33 and operation amplifier systems 38 and 39 will be sampled respectively by the sampling circuits 52, 53 and 54 and will be further returned to the compensation circuit 34 and adding circuit 40 respectively through low pass filter circuits 55, 56 and 57.

As the third embodiment is formed as described above, when the light path limiting member 49 is not inserted in the light path, all the beam will be able to be used and therefore the operation will be the same as of an ordinary surface profile measuring device of a high resolving power. On the other hand, when the light path limiting member 49 is inserted in the light path, half the beam will be limited and, as shown in FIG. 9, only the beam half a will hit the sample, will be reflected to return as the beam half b, will be taken out by the beam splitter 30 and will be imaged on the PSD 47 by the operation of the image forming lens 46 and the focus will be detected by the same principle as of the automatic focus adjustment by a light interruption method. Therefore, in this embodiment, the inherent operation as in the surface profile measuring device of a high resolving power and the operation as in the automatic focus detecting device using the light interruption method can be time-divisionally realized. As it is, the resolving power and measuring range will vary time divisionally. Therefore, as shown in FIG. 11, the phase and level of the output signals from the sensor 50 are corrected by a correction circuit 51, the signals from the operation amplifiers 33, 38 and 39 are sampled respectively by the sampling circuits 52, 53 and 54 and are then passed respectively through the low pass filters 55, 56 and 57 to time-average the time-divided information. Therefore, if the stage 36 is driven slowly enough in the X-axis direction (in fact, unless it is driven slowly, the vibration will be so large as to be of no use), the surface profile measuring device of a high resolving power and the surface profile measuring device having a wide measuring range will substantially simultaneously exist and, as a result, the same measuring area will be substantially simultaneously measured with two measuring ranges. Therefore, the same as in the first embodiment, it will be easy to set the detecting head within the measuring range and the automatic measurement will be possible. By the way, in FIG. 10, the synchronizing signal of the light path limiting member (chopper) 49 is detected with the sensor 50 but the light path limiting member 49 may be rotated by a stepping motor so as to put the driving pulses of the stepping motor into the correction circuit 51.

Figure 12:
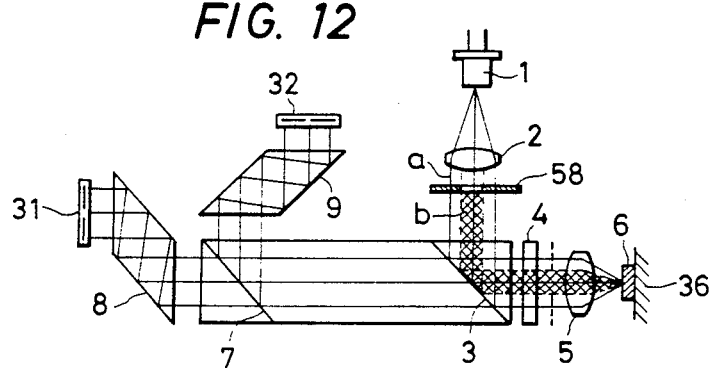
FIG. 12 is a view showing an optical system of the fourth embodiment of the present invention.
Figure 13:
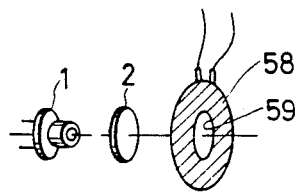
FIG. 13 is a perspective view showing an example of a light path limiting means used in the fourth embodiment.
Figure 14:
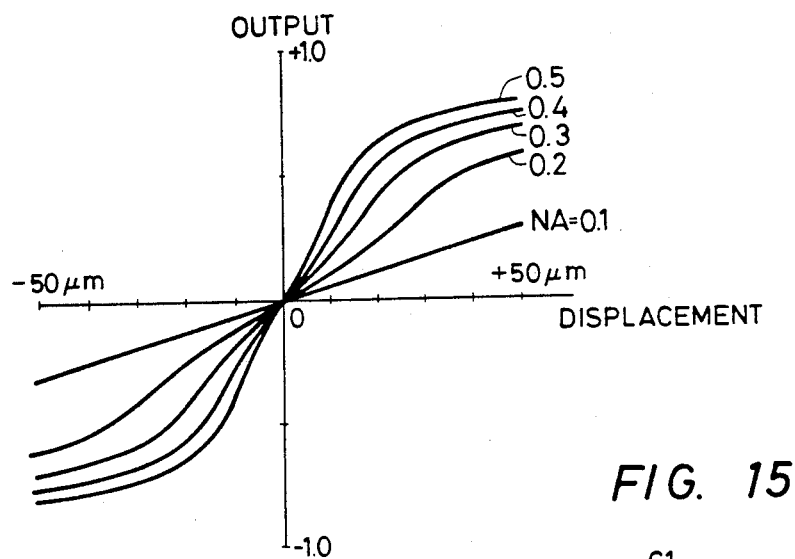
FIG. 14 is a graph showing the relations between the step height variation and output in the fourth embodiment.

FIGS. 12 to 14 show respectively an optical system, light path limiting means and displacement-output relations of the fourth embodiment. This is the same as the conventional surface profile measuring device provided with the light path limiting member utilizing the critical angle method except that an insertable light path limiting member 58 is arranged in the light path between the collimator lens 2 and polarization beam splitter 3. The light path limiting member 58 has a center opening 59 as shown in FIG. 13 so as to operate to partly leave in a concentric circle the central part of all the beam and the size of the center opening 59 can be freely set. Concretely, a liquid crystal shutter is used so that, when driving pulses come, the other part than the center opening 59 will intercept the beam but, when the driving pulses do not come, all the beam will pass.

Figure 15:
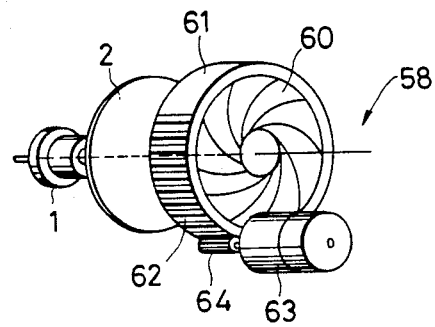
FIG. 15 is a perspective view showing another example of the light path limiting means used in the fourth embodiment.

As the fourth embodiment is formed as described above, when the driving pulses are not fed to the light path limiting member 58 and all the beam pass, the same function as of the conventional surface profile measuring device will be performed. When the driving pulses are fed to the light path limiting member 58, the beam diameter will be limited, as a result, the NA of the objective lens 5 will become smaller, the sensitivity to the displacement (height variation) will become lower as shown in FIG. 15 and the measuring range will expand. When the driving pulses are fed in time-division and are processed the same as in the third embodiment, the same effect as of the other already described embodiments will be obtained.

Figure 16:
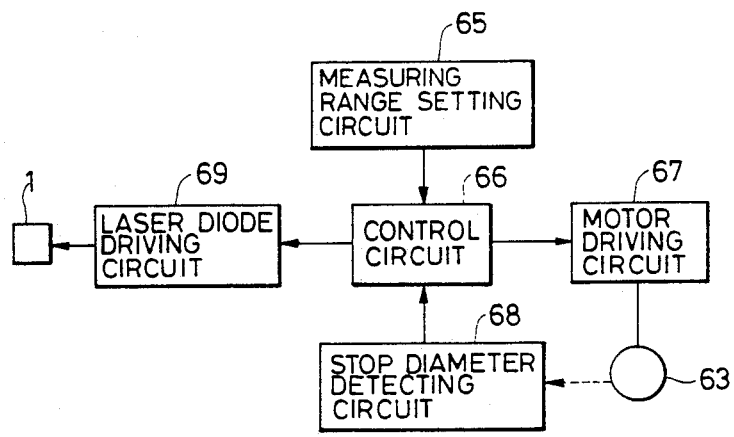
FIG. 16 is a block diagram of a signal processing system in the fourth embodiment used together with the light path limiting means of FIG. 15.

FIGS. 15 and 16 show an example wherein such iris stop as is used in cameras or the like is adopted for the light path limiting member 58 in the fourth embodiment. That is to say, in FIG. 15, a rack 62 is formed over a range on the outer periphery of a rotary ring 61 for opening and closing stop blades 60 and a pinion 64 meshing with the rack 62 is secured to the shaft of an encoder D.C. motor 63. FIG. 16 shows a signal processing system adapted to this iris stop. The reference numeral 65 represents a measuring range setting circuit, 66 represents a control circuit, 67 represents a motor driving circuit, 68 represents a stop diameter detecting circuit and 69 represents a laser diode driving circuit.

In this embodiment, when the measuring range is set by the measuring range setting circuit 65, the motor driving circuit 67 will be controlled through the control circuit 66 and the motor 63 will be driven. When the motor 63 is driven, the rotary ring 61 will be rotated through the pinion 64 and rack 62, the stop blades 60 will be moved to vary the stop diameter. At this time, the signal from the encoder part of the motor 61 will be put into the stop diameter detecting circuit 68 to detect the stop diameter. When the stop diameter corresponds to the range set by the measuring range setting circuit 65, the motor 63 will be stopped through the control circuit 66 and motor driving circuit 67.

Now, if the stop blades 60 are stopped down the beam at this time will be the beam half b (hatched part) shown in FIG. 12. In this state, the NA of the beam entering the sample 6 will be smaller than of the beam a in the case that the stop blades 60 are not stopped down and this is equivalent to the NA of the objective lens 5 being made smaller. When the NA is made smaller, the measuring range obtained in the calculation will expand as is shown in FIG. 14 and this coincides with experimental results. Therefore, when the stop diameter of the light path limiting member 58 is varied, the measuring range will be able to be freely set. However, if the measuring range is expanded by making the NA smaller, the resolving power will reduce with it and, as shown in the table in FIG. 17, the size of the measuring spot on the sample 6 will also become larger. Therefore, it is necessary to set the measuring range in conformity with the object and purpose of the measurement. If the stop blades 60 are stopped down, the radiation amount will reduce and, as a result, the S/N ratio will become smaller. Therefore, it is possible to control the laser diode driving circuit 69 with the control circuit 66 by utilizing the signal from the stop diameter detecting circuit 68 and to set the laser beam amount to increase when the stop diameter becomes smaller.

Here, the light path limiting member 58 may be of a turret type stop wherein a plurality of stops of different diameters are arranged on the periphery as shown in FIG. 18, and a switching type stop wherein a plurality of stops of different diameters are arranged straight as shown in FIG. 19 which can limit the beam. The stop diameter is varied by using the motor 63 but, needless to say, may be manually varied.

The light path limiting member 58 is located between the collimator lens 2 and polarization beam splitter 3 but can be located between the polarization beam splitter 3 and objective lens 5. However, in such case, the effective NA will be reduced also for the beam reflected and returning from the sample 6 and, if the sample 6 is inclined, the reflected beam will be cut by the light path limiting member and therefore, the measuring range will become narrower.

As in the above, when large wavinesses and irregularities on the surface of the object to be measured are desired to be seen, if the opening of the light path limiting member 58 is stopped down to make the NA smaller, the measuring range will expand and the approximate profile of the surface will be able to be measured. At this time, the measuring spot size will also become larger and therefore will be able to be measured without being influenced by such small irregularities as dust on the surface. Further, as only the NA on the beam entrance side to the sample is made smaller, even if the sample inclines, it will be less likely to be influenced than when the NA of the objective lens itself is made smaller. If the opening of the light path limiting member 58 is opened to make the NA larger, the measuring range will contract but the resolving power will improve and therefore the device will be able to be used as a conventional surface profile measuring device of a high resolving power.

Therefore, when the opening of the light path limiting member 58 is properly adjusted, one surface profile measuring device will be able to be freely converted from a surface profile measuring device of a high resolving power to a surface profile measuring device of a wide measuring range and the performance of the surface profile measuring device will be able to be freely set in response to the measured object and measuring purpose.

FIG. 20 shows the fifth embodiment wherein a zoom lens system 70 of a variable focal distance is arranged instead of the collimator lens 2 and light path limiting member 58 in the embodiment shown in FIG. 12. The zoom lens system 70 functions as a collimator lens of a variable focal distance. By freely varying the focal distance, the laser beam can be converted to such beam having any diameter as, for example, shown by the symbol b (hatched part). This zooming may be made manually or by any electric motor system.

In the case of this example, as only the NA on the beam entrance side to the sample 6 can be made smaller by only setting the zoom lens system 70, there is the same effect as of the embodiment in FIG. 12 and, as the radiation amount is not decreased, there is an advantage that the S/N ratio can be kept constant.

Figure 21:
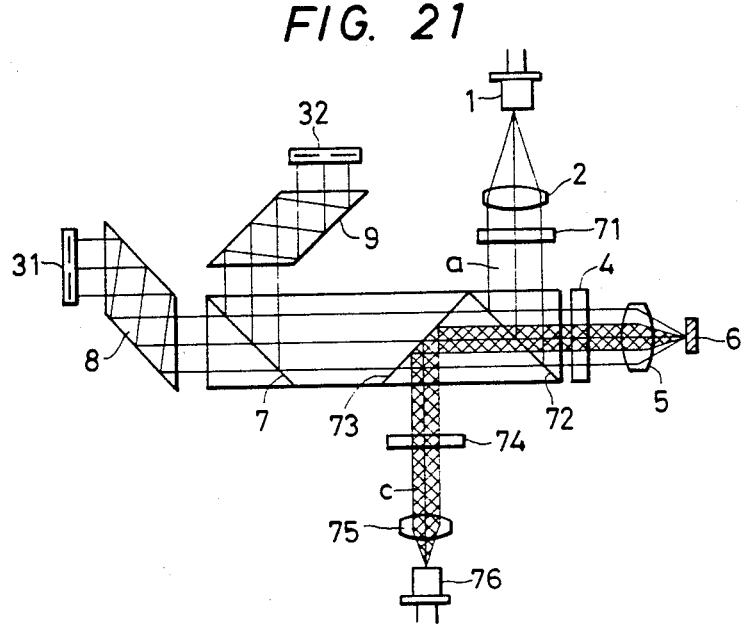
FIG. 21 is a view showing an optical system of the sixth embodiment of the present invention.

FIG. 21 shows the sixth embodiment wherein, in FIG. 12, a polarizing plate 71 is arranged to conform to the direction of the polarized beam from the laser diode 1 in the position of the light path limiting member 58, the polarization beam splitter 3 is replaced with a non-polarization beam splitter 72, a non-polarization beam splitter 73 is newly provided between the beam splitter 72 and beam splitter 7 and the beam splitter 73, a new polarizing plate 74, collimator lens 75 and laser diode 76 are arranged optically in the same position relations with the beam splitter 72, polarizing plate 71, collimator lens 2 and laser diode 1. However, here, as the focal distance of the collimator lens 75 is selected to be shorter than the focal distance of the collimator lens 2, the beam c (hatched part) through the collimator lens 75 will be finer than the beam a and the NA on the beam entrance side will be smaller.

By the way, the components reflected by the beam splitter 72 or 73 of the reflected beam from the sample 6 will advance to the laser diode 1 or 76 side but will pass twice through the ¼-wave plate 4 until the polarized direction intersects rectangularly with the polarizing plate 71 or 74 and therefore will not return to the laser diode 1 or 76 to produce backtalk noises. The reflecting surfaces are so many that particularly the loss on the beam c side will be much but, when the reflectivity of the beam splitters 72 and 73 is made about 25%, the reflection loss on the beam c side will be reduced to some extend. Also, the beam will not be particularly cut. If the number of the light projecting systems each formed of a laser diode, collimator lens, polarizing plate and beam splitter is within the range in which the reflection loss can be covered with the laser beam amount, two or more light projecting systems may be provided.

In the case of this example, there is an advantage that the characteristics of the surface profile measuring device can be instantly varied by switching to use only either one of the laser diodes 1 and 76. Further, when the laser diodes 1 and 76 are modulated with frequencies high enough and respectively different or are alternately lighted at a high speed with the same frequency, the surface profile measuring device will be able to have simultaneously the characteristics of both high resolving power and wide measuring range.

Figure 22:
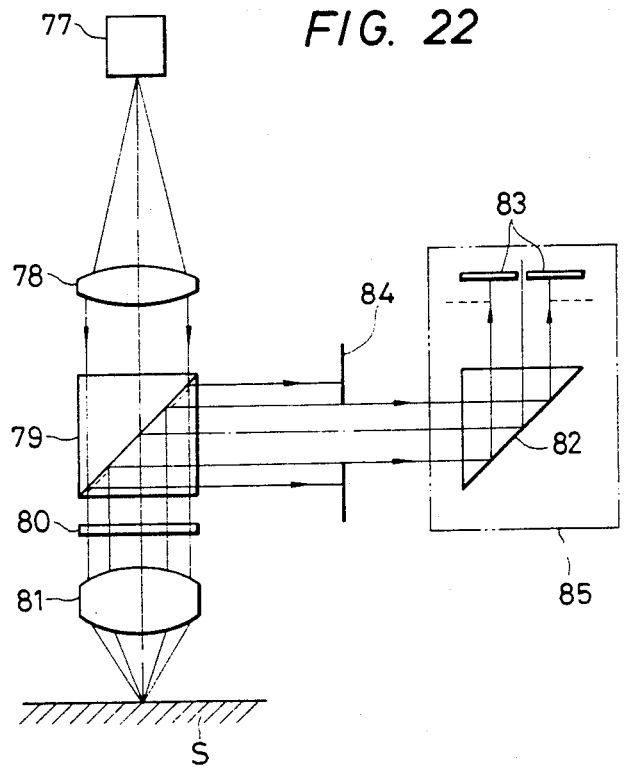
FIG. 22 is a view showing an optical system of the seventh embodiment of the present invention.

FIG. 22 shows an optical system of the seventh embodiment of the present invention. In this embodiment, an aperture stop is set in front of a detecting system and the numerical aperture on the detecting side is made smaller than the numerical aperture of the beam incident upon the surface of a sample to be measured so that, even if the surface of the sample to be measured inclines, the detected beam amount on the light receiving device will not be unbalanced. That is to say, in FIG. 22, the reference numeral 77 represents a light source consisting of a semiconductor laser, 78 represents a collimator lens, 79 represents a polarization beam splitter, 80 represents a ¼-wave plate, 81 represents an objective lens, 82 represents a critical angle prism, 83 represents a two-divided photodetector and 84 represents an aperture stop provided between the polarization beam splitter 79 and a focus error detecting system 85 including the critical angle prism 82 and two-divided photodetector 83 to limit the reflected beam from the measured surface S to be in a predetermined range.

Figure 23C:
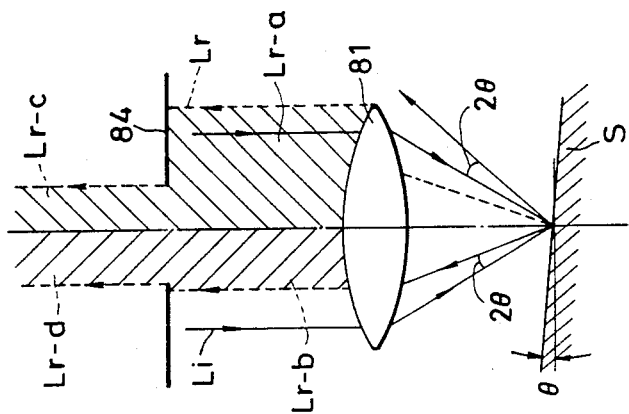
FIGS. 23A, 23B and 23C are explanatory views showing variations of the entering beam and the reflected beam on the measured surface.
Figure 23B:
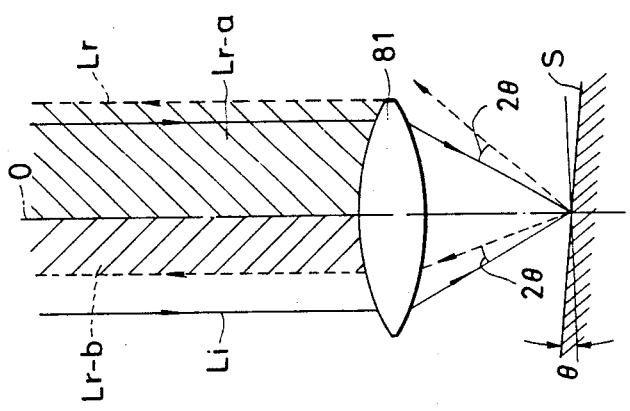
Figure 23A:
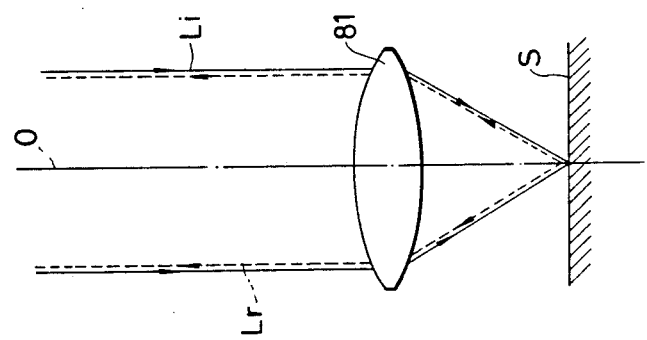

As the seventh embodiment is formed as mentioned above, the laser beam emitted from the light source 77 will be made a parallel beam by the collimator lens 78, will then pass through the polarization beam splitter 79 and ¼-wave plate 80 and will be converged on the measured surface by the objective lens 81. The reflected beam from the measuring surface S will be returned to a parallel beam by the objective lens 81, will pass through the ¼-wave plate 80 and will be led to the focus error detecting system 85 by the polarization beam splitter 79. In this case, the reflected beam will be limited by the aperture stop 84 and therefore, as a result, the NA on the measured surface of the detecting beam will be limited. Here, the operation of the aperture stop 84 shall be explained in detail on the basis of FIG. 23. FIG. 23A shows the state where the measured surface S is not inclined, that is, the state that the normal of the measured surface S coincides with the optical axis O. In this case, the incident beam $L_i$ (illustrated by the solid lines) before entering the objective lens 81 and the reflected beam $L_r$ (illustrated by the broken lines) after reflecting from the measured surface S and passing through the objective lens 81 perfectly coincide with each other. On the other hand, in case the measured surface S is inclined by an angle $\theta$ with the horizontal plane as shown in FIG. 23B, the reflected beam $L_r$ will be reflected as inclined by $2\theta$ with the reflected beam in case the measured surface is not inclined and the incident beam $L_i$ before entering the objective lens 81 and the reflected beam $L_r$ after reflecting from the measured surface S and passing through the objective lens 81 will not coincide with each other and will be asymmetrical with respect to the optical axis O. That is to say, the reflected beam divided by a plane vertical to the paper surface inclining the optical axis O will be divided into reflected beam $L_r$-a and reflected beam $L_r$-b, in the case of FIG. 23B, the reflected beam $L_r$-a will be larger in cross-section than the reflected beam $L_r$-b and therefore the radiation amount is larger on the reflected beam $L_r$-a side. Now, in FIG. 22, in case the aperture stop 84 is not provided, even on the two-divided photodetector 83 detecting the reflected beam $L_r$, the photodetector receiving the light on the reflected beam $L_r$-a side will receive a larger radiation amount than of the photodetector receiving the beam on the reflected beam $L_r$-b side and, while in the same focused state, the two outputs on the two-divided photodetector 83 will be unbalanced and no correct measurement will be made. Here, if the aperture stop 84 is provided as shown in FIG. 23C, only the reflected beam parts $L_r$-c and $L_r$-d of equal cross-sectional areas having passed through the aperture stop 84 of the reflected beams $L_r$-a and $L_r$-b will reach the two-divided photodetector 83 and therefore the unbalance of the radiation amounts on the two-divided photodetector 83 by the inclination of the measured surface S by the angle $\theta$ will be perfectly canceled by the aperture 84. Therefore, when the aperture stop 84 limiting the reflected beam is only added to the formation of the ordinary surface profile measuring device using a critical angle method, even if the measured surface S is inclined, a correct measurement with high precision will be possible.

In the above mentioned seventh embodiment, the aperture stop 84 is set between the polarization beam splitter 79 and the focus error detecting system 85 but may be set between the critical angle prism 82 and two-divided photodetector 83 in the focus error detecting system 85 as shown by the dotted lines in FIG. 22. However, in this case, a width corresponding to the displacement in the Z-axis direction or the step height of the measured surface S in a fixed stop diameter will be narrower by the amount by which the position of the aperture stop is farther from the objective lens than in the case of the embodiment in FIG. 22. Therefore, in the case of the embodiment in FIG. 22, the aperture stop 84 is set in a position adjacent to the polarization beam splitter 79 but, in case it is not necessary to enable the removal or stop diameter adjustment, the aperture stop 84 may set on the reflecting surface of the polarization beam splitter 79 as indicated by the dotted lines.

Figure 24:
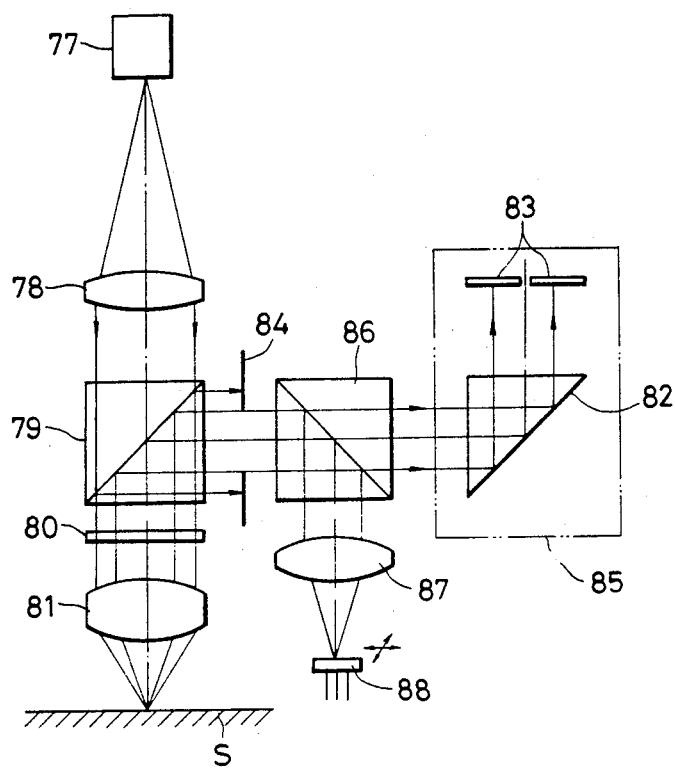
FIG. 24 is a view showing an optical system of the eighth embodiment of the present invention.
Figure 25:
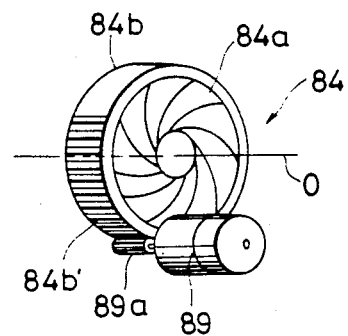
FIG. 25 is a perspective view showing an example of an aperture stop means used in the seventh and eighth embodiments.
Figure 26:
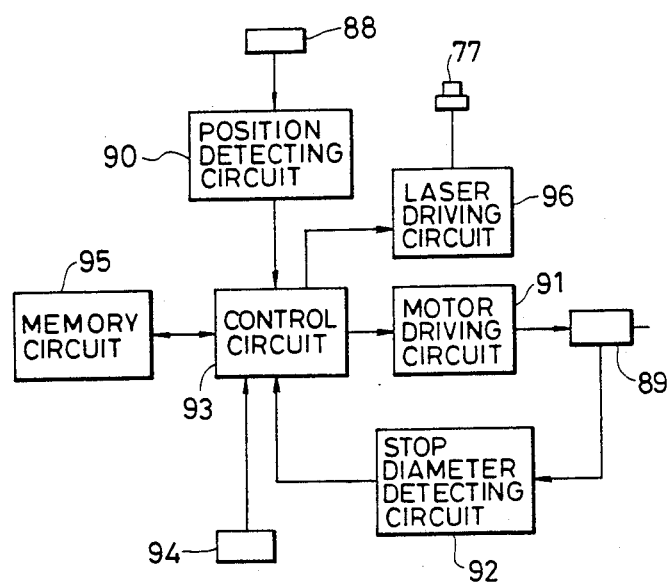
FIG. 26 is a block diagram of an electric control circuit part used in the eighth embodiment.

FIG. 24 shows an eighth embodiment somewhat different from the embodiment shown in FIG. 22. In this embodiment, a non-polarization beam splitter 86 is provided between the aperture stop 84 and focus error detecting system 85 so that a part of the reflected beam may be converged on a semiconductor position detecting element (PSD) 88 by an image forming lens 87 and such iris stop used in cameras or the like is adopted for the aperture stop 84 so that the stop diameter may be variable. That is to say, in FIGS. 25 to 27, the reference numeral 84a represents a stop blade, 84b represents a stop ring which has a rack 84b formed on a part of the outer peripheral surface and is connected to the stop blades 84a through a well known mechanism so that the stop diameter may be variable by the rotation, 89 represents a step motor in which a pinion 89a meshing with the track 84b is secured to the rotor shaft, 90 represents a position detection circuit connected to the semiconductor position detecting element 88, 91 represents a motor driving circuit, 92 represents a stop diameter detecting circuit, 93 represents a control circuit, 94 represents an external condition setting circuit, 95 represents a memory circuit, 96 represents a semiconductor laser driving circuit, the symbol $D_1$ represents a stop diameter of the aperture stop 84, $D_2$ represents a maximum effective beam diameter of the optical system, $D_3$ represents a beam diameter of the reflected beam when the measured surface S is inclined and O represents a center position of the beam diameter $D_3$.

Figure 27:
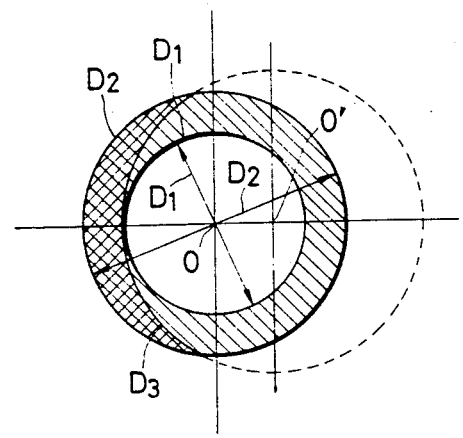
FIG. 27 is an explanatory view showing the shift of reflected beam by the inclination of the measured surface.

In this eighth embodiment, the reflected beam from the measured surface S will be polarized by the polarization beam splitter 79 and will then pass through the aperture stop 84 and a part of the beam will be led out by the non-polarization beam splitter 86, will enter the image forming lens 87 and will be imaged on the semiconductor position detecting element 88. Now, the semiconductor detecting element 88 setting position is so adjusted that the image on the above mentioned detecting element 88 will come substantially to the center position in case the measured surface is not inclined. If the output of the position detecting circuit 90 at this time is memorized in the memory circuit 95 through the control circuit 93, the image forming point on the semiconductor position detecting element 88 will be displaced in response to the inclinations of the measured surface in such directions as are indicated by the arrows in FIG. 24. This displaced position will be put out as an electric signal by the position detecting circuit 90 and will be compared in the control circuit 93 with the result memorized in the memory circuit 95 in the case where the measured surface S is not inclined and, as a result, the step motor 89 will be driven through the motor driving circuit 91 to open or close the aperture stop 84 operatively connected with the step motor. The stop diameter of the thus opened and closed aperture stop 84 is always monitored by the stop diameter detecting circuit 92. As a result, the semiconductor laser driving circuit 96 will be controlled through the control circuit 93 and the emitted radiation amount of the semiconductor laser, that is, the light source 77 will be adjusted so that, even if the stop diameter varies, the S/N ratio will not vary. FIG. 27 shows the shape of the beam spot in the position of the aperture stop 84. That is to say, in case the measured surface S is not inclined, the reflected beam from the measured surface S will become a circle with the optical axis O as a center but, in case the measured surface S is inclined, the center O' of the reflected beam will come to a position displaced from the optical axis O. At this time, when the aperture stop 84 is not stopped down and the output from the position detecting circuit 90 is compared with the result memorized in the memory circuit 95 in the case where the measured surface S is not inclined, if there is a difference larger than is set by the external condition setting circuit 94 between them, the stop diameter of the aperture stop 84 shall be made smaller by the minute amount set by the external condition setting circuit 94. Thus, when the output from the position detecting circuit 90 is again compared with the contents memorized in the memory circuit 95, if the difference between them is large, the stop diameter of the aperture stop 84 shall be further made smaller by the above mentioned minute amount. If this procedure is repeated to make the stop diameter of the aperture stop 84 gradually smaller, the stop diameter of the aperture stop 84 will finally become a size $D_1$ internally contacting the beam diameter $D_3$ of the reflected beam when the measured surface S is inclined and the adjustment of the aperture stop 84 will end in this position. The thus obtained stop diameter $D_1$ will result in removing the influence of the inclination of the measured surface S at the time and giving the largest NA.

By the way, the contents memorized in the memory circuit 95 have been explained here as of the measured surface S when not inclined, but the contents memorized in the memory circuit 95 may be renewed successively and, when the contents no longer vary, the contraction of the stop diameter may be stopped. Also, the case that the aperture stop 84 is formed as an iris stop has been explained as an example but the aperture stop 84 may be formed as a liquid crystal stop or the like in which a transparent electrode is concentrically circularly arranged as shown in FIG. 13.

Thus, according to the eighth embodiment, the optimum stop diameter of the aperture stop 84 can be automatically set in response to the inclination of the measured surface S and therefore the initial setting or optimum setting of the measurement can be automated.

By the way, in each of the above mentioned embodiments, two surface profile measuring devices are actually formed but three or more may be formed.

What is claimed is:

1. An optical surface profile measuring device having a measuring light projecting optical system including therein a light source, a collimator lens, a polarization beam splitter, a ¼-wave plate and an objective lens to project a measuring light onto a surface to be measured; a light transmitting system including therein said objective lens, said ¼-wave plate, said polarization beam splitter and a first beam splitter to transmit the reflected light from the measured surface; and a first detecting system including therein a plurality of photosensors arranged to receive said reflected light passed through said polarization beam splitter and further divided by said first beam splitter and to emit an output signal in accordance with a distance between said measured surface and a focal point of said objective lens said optical surface profile measuring device further comprising:
a second detecting system including therein (a) a second beam splitter arranged between said polarization beam splitter and said first beam splitter in said light transmitting system, and (b) photosensor means arranged to receive reflected light passed through said polarization beam splitter and reflected by said second beam splitter, for emitting an output signal in accordance with a distance between said measured surface and a focal point of said objective lens.

2. An optical surface profile measuring device according to claim 1 wherein said first detecting system is formed as a first optical surface profile measuring means of a high resolving power, said second detecting system is formed as a second optical surface profile measuring means having a wide measuring range, and said first and second optical surface profile measuring means are so arranged that a same part on the surface to be measured by said first and second detecting systems may be simultaneously measured.

3. An optical surface profile measuring device according to claim 2 wherein said second optical surface profile measuring means comprises a cylindrical lens and a four-divided photosensor.

4. An optical surface profile measuring device according to claim 2 wherein said second optical surface profile measuring means comprises an image forming lens, a semiconductor position detecting device and a light path limiting member arranged between said second beam splitter and image forming lens to limit the light beam to approximately one half its beam width.

5. An optical surface profile measuring device according to claim 2 wherein said second detecting system is adapted for use as an autofocus control means.

6. An optical surface profile measuring device according to claim 1 further comprising a light path limiting member insertably in the light path between said collimator lens and polarization beam splitter to interrupt half the light beam when inserted, said first detecting system being formed as a first optical surface profile measuring means of high resolving power, and said second detecting system being formed as a second optical surface profile measuring means having a wide measuring range, whereby, when said light path limiting member is periodically inserted into the light path, the measuring range of said second optical surface profile measuring means is time-divisionally expanded and thereby a same part on the surface to be measured is substantially simultaneously measured with a plurality of measuring ranges.

7. An optical surface profile measuring device according to claim 6 wherein a chopper is used for said light path limiting member.

8. An optical surface profile measuring device according to claim 1 further comprising an aperture stop means arranged between said polarization beam splitter and second beam splitter in said light transmitting system to make the numerical aperture on a detecting side smaller than the numerical aperture on a projecting side.

9. An optical surface profile measuring device according to claim 8 wherein said aperture stop means is formed so as to be able to vary the stop diameter.

10. An optical surface profile measuring device according to claim 8 further comprising a position detecting circuit, a control circuit connected to said position detecting circuit, a memory circuit connected to said control circuit, a motor driving circuit connected to said control circuit, a stepping motor connected to said aperture stop means and motor driving circuit to vary the stop diameter of said aperture stop means, the stop diameter of said aperture stop means being automatically adjusted to cancel the influence of inclination of the measured surface.

11. An optical surface profile measuring device according to claim 10 further comprising a light source driving circuit connected between said control circuit and light source, the emitting light amount of said light source being automatically adjusted in accordance with the variation of stop diameter of said aperture stop means to keep the light amount on the measured surface constant.

12. An optical surface profile measuring device according to claim 8 wherein said aperture stop means is formed so as to be able to vary the stop diameter.

13. An optical surface profile measuring device having a measuring light projecting optical system including: a light source, a collimator lens, a polarization beam splitter, a ¼-wave plate and an objective lens therein to project a measuring light onto a surface to be measured; a light transmitting system including said objective lens, said ¼-wave plate, said polarization beam splitter and a beam splitter therein to transmit the reflected light from the measured surface; and a detecting system including a plurality of photosensors arranged to receive said reflected light divided by said beam splitter and to emit an output signal in accordance with a distance between said measured surface and a focal point of said objective lens, said measuring device further comprising:
a light path limiting means inserted in the measuring light projecting optical system for varying a diameter of the light beam entering said polarization beam splitter, so that when said light beam diameter is made smaller by said light path limiting member, the measuring range is expanded and thereby a same part on the surface to be measured is able to be measured with a plurality of measuring ranges which are different from each other by varying said light beam diameter with said light path limiting means.

14. An optical surface profile measuring device according to claim 13 wherein said light path limiting means is a liquid crystal shutter.

15. An optical surface profile measuring device according to claim 13 wherein said light path limiting device is an iris stop means.

16. An optical surface profile measuring device according to claim 13 further comprising a drive controlling means connected to said light source and light path limiting means, whereby, when said light path limiting means is operated to make the light beam diameter smaller, the light amount of said light source being increased by said drive controlling means.

17. An optical surface profile measuring device according to claim 13 wherein said light path limiting means is formed as a turret type stop in which a plurality of openings of different diameters are arranged on a turret periphery.

18. An optical surface profile measuring device according to claim 13 wherein said light path limiting means is formed as a switching type stop in which a plurality of openings of different diameters are arranged in a straight fashion.

19. An optical surface profile measuring device according to claim 13 wherein said light path limiting means is arranged in the light path between said collimator lens and said polarization beam splitter and includes means for varying the diameter of the light beam entering said polarization beam splitter.

20. An optical surface profile measuring device according to claim 13 wherein said light path limiting means is disposed in the light path between said polarization beam splitter and said objective lens and includes means for varying the diameter of the light beam entering said polarization beam splitter.

21. An optical surface profile measuring device according to claim 13 wherein said light path limiting means comprises a zoom lens system.

22. An optical surface profile measuring device having a first measuring light projecting optical system including therein a first light source, a first collimator lens and an objective lens to project a first measuring light onto a surface to be measured, a light transmitting system including therein said objective lens and a beam splitter to transmit the reflected light from the measured surface, and a detecting system including a plurality of photosensors arranged to receive said reflected light divided by said beam splitter and to emit an output in accordance with a distance between said measured surface and focal point of said objective lens, said optical surface profile measuring device further comprising:
a second measuring light projecting optical system including therein a second light source, a second collimator lens and said objective lens to project a second measuring light onto the measured surface, a light beam width of said first collimator lens being different from a light beam width of said second collimator lens, said first and second measuring light projecting optical systems being arranged to both measure the same portion of said measured surface.

23. An optical surface profile measuring device having a measuring light projecting optical system including therein a light source, a collimator lens, a polarization beam splitter, a ¼-wave plate and an objective lens to project a measuring light onto a surface to be measured; a light transmitting system including therein said objective lens, said ¼-wave plate and said polarization beam splitter to lead the reflected light from the measured surface outside of said measuring light projecting optical system; and a detecting system including therein a critical angle prism capable of reflecting the reflected light from the measured surface led through said light transmitting system and a photosensor arranged to receive the reflected light from said critical angle prism and to emit an output in accordance with a distance between said measured surface and said objective lens, characterized in that said optical surface profile measuring device further comprises aperture stop means arranged between said polarization beam splitter and said critical angle prism in said light transmitting system to make a numerical aperture of said detecting system smaller than a numerical aperture of said measuring light projecting optical system.

24. An optical surface profile measuring device according to claim 23 wherein said aperture stop means is formed so as to be able to vary the stop diameter.

25. An optical surface profile measuring device according to claim 23 wherein said aperture stop means is provided on the reflecting surface of said polarization beam splitter.

26. An optical surface profile measuring device having a measuring light projecting optical system including therein a light source, collimator lens, polarization beam splitter, ¼-wave plate and objective lens to project a measuring light onto a surface to be measured; a light transmitting system including therein said objective lens, said ¼-wave plate and said polarization beam splitter to lead the reflected light beam from the measured surface outside of said measuring light projecting optical system; and a detecting system including therein a critical angle prism capable of reflecting the reflected light from the measured surface led through said light transmitting system and a photosensor arranged to receive the reflected light from said critical angle prism and to emit an output to detect whether the measured surface is in focus position or not, characterized in that said optical surface profile measuring device further comprises:
an aperture stop means arranged between said critical angle prism and said photosensor in said detecting system to make the numerical aperture of said detecting system smaller than the numerical aperture of said measuring light projecting optical system.

27. An optical surface profile measuring device according to claim 26 wherein said aperture stop means is formed so as to be able to vary the stop diameter.

* * * * *